Figure 5:
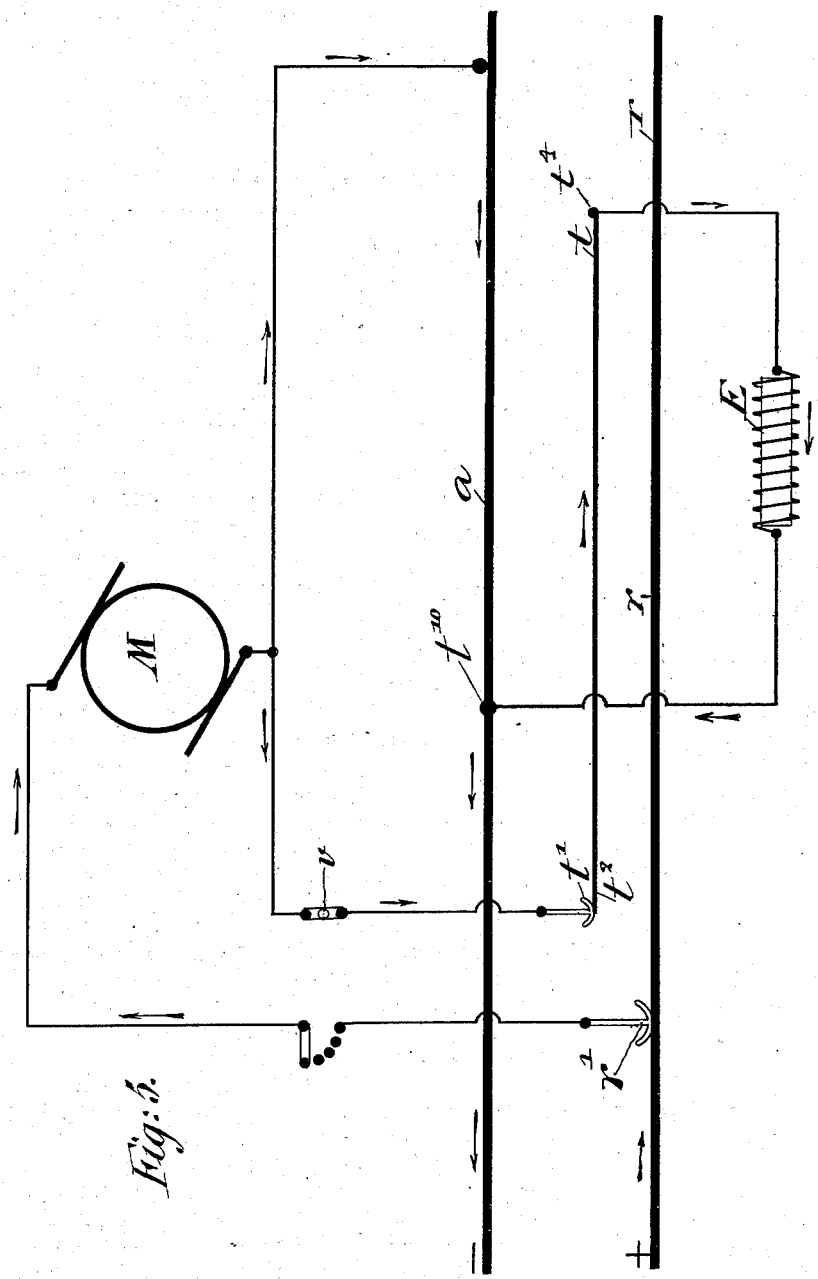

No. 749,597. PATENTED JAN. 12, 1904.
J. G. WENIGER.
ELECTRIC RAILWAY SWITCH.
APPLICATION FILED JUNE 9, 1903.
NO MODEL. 3 SHEETS—SHEET 1.
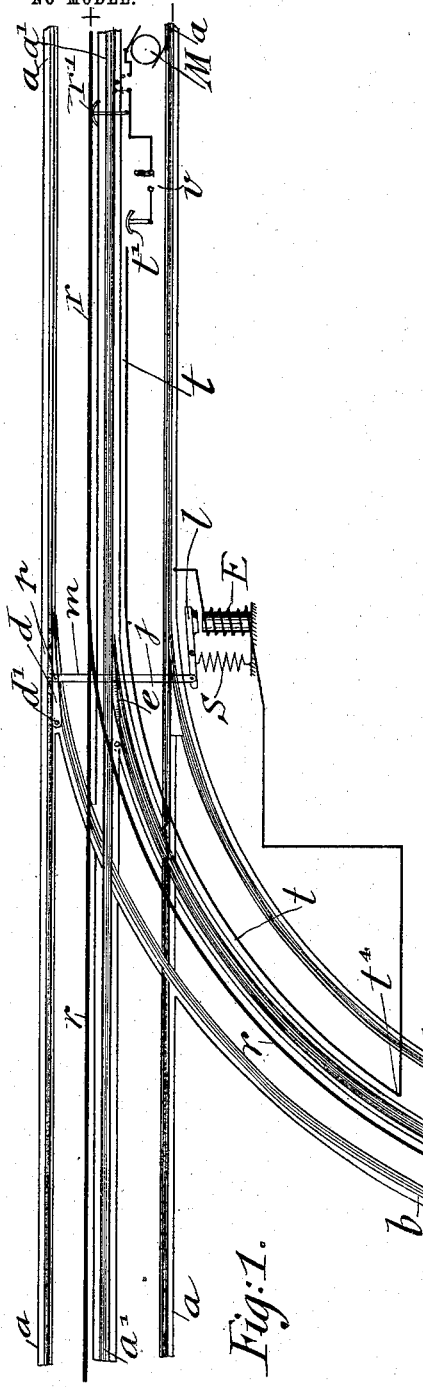
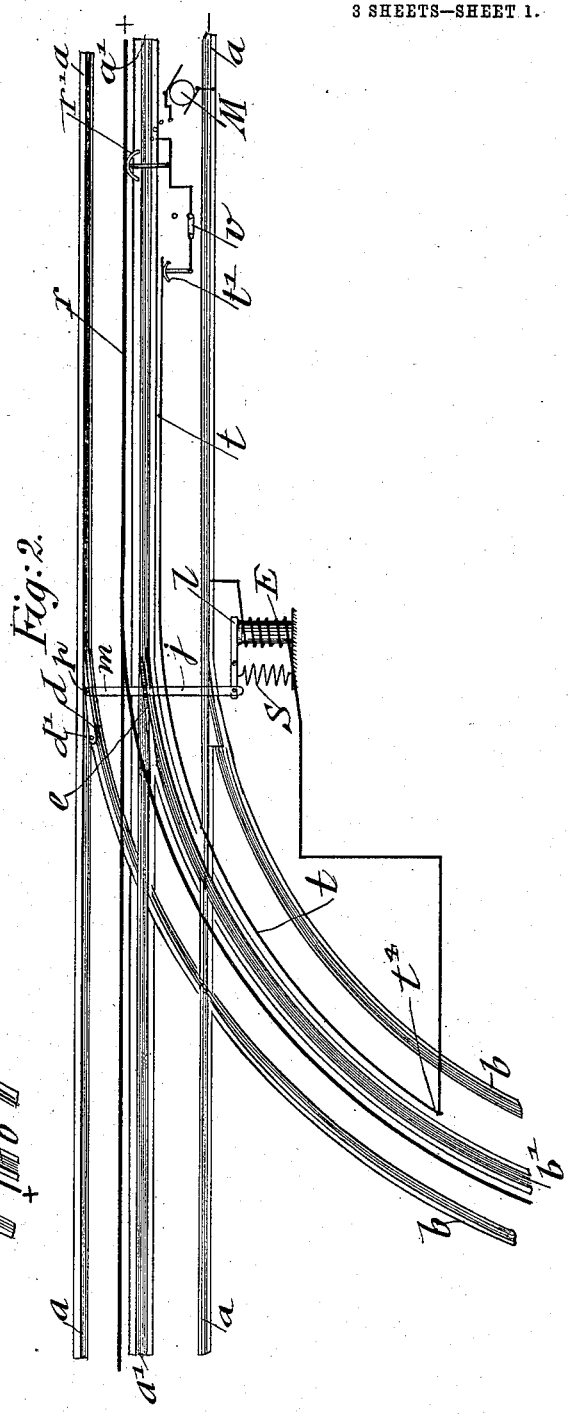
Witnesses
C. P. Goepel
Henry J. Suhrbier
Inventor
Johann Georg Weniger
By his Attorneys
Sower Niles

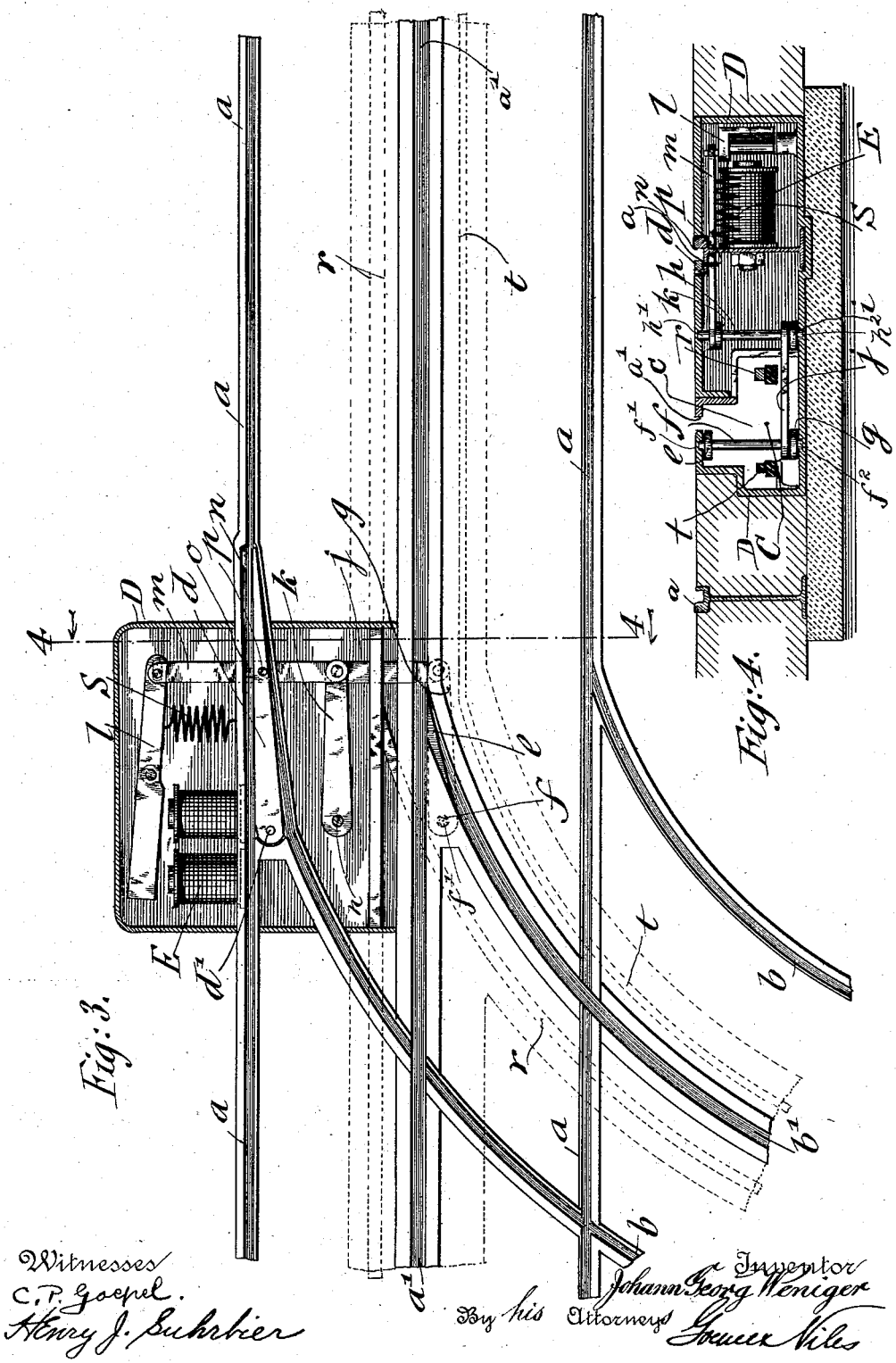

No. 749,597. PATENTED JAN. 12, 1904.
J. G. WENIGER.
ELECTRIC RAILWAY SWITCH.
APPLICATION FILED JUNE 9, 1903.
NO MODEL. 3 SHEETS—SHEET 3.

Witnesses
C. P. Goepel.
Henry J. Suhrbier.

Inventor
Johann Georg Weniger
By his Attorneys
James Niles

No. 749,597. Patented January 12, 1904.

UNITED STATES PATENT OFFICE.

JOHANN GEORG WENIGER, OF NEW YORK, N. Y.

ELECTRIC-RAILWAY SWITCH.

SPECIFICATION forming part of Letters Patent No. 749,597, dated January 12, 1904.

Application filed June 9, 1903. Serial No. 160,780. (No model.)

*To all whom it may concern:*

Be it known that I, JOHANN GEORG WENIGER, a citizen of the Empire of Germany, residing in New York, borough of Manhattan, and State of New York, have invented certain new and useful Improvements in Electric-Railway Switches, of which the following is a specification.

The invention relates to certain improvements in electric-railway switches for underground traction systems by which the switch-tongue of the track-switch can by set from a car whenever the same is to pass from the main track to the side track without requiring the setting of the switch-tongue by hand, the device being so arranged that the pivoted guide-piece in the conduit is simultaneously set with the switch-tongue of the tracks, so as to direct the contact-shoe of the car and switch the car over from the main track to the side track; and for this purpose the invention consists of a switch for electric railways which comprises a switch-tongue at the junction of the side track with the main track, a pivoted guide-piece in the conduit at the junction of the conductor for the main track with the conductor for the side track, mechanism connecting the switch-tongue and guide-piece, and means for actuating said mechanism when the car approaches the junction of the main and side tracks when it is desired to switch the car over to the side track.

The invention consists, further, of returning the switch-tongue and guide-piece to their normal position when the car has passed the junction and of certain additional details of construction and combination of parts, as will be more fully described hereinafter and finally pointed out in the claims.

In the accompanying drawings, Figures 1 and 2 represent plan views of a main and side track with my electrically-operated switch mechanism, showing the switch-tongue respectively as set for the main track and the side track. Fig. 3 is a plan view of the switch and its operating mechanism drawn on a larger scale. Fig. 4 is a vertical transverse section of Fig. 3, taken on line 4 4, Fig. 3; and Fig. 5 is a wiring diagram showing the auxiliary circuit operating the switch mechanism as connected with the car-operating main circuit.

Similar letters of reference indicate corresponding parts.

Referring to the drawings, $a\,a$ represent the rails of the main track, $b\,b$ the rails of the side track, $a'$ the slots of the main-track conduit, and $b'$ the slots of the side-track conduit.

C represents the conduit, similar to that in general use for underground traction systems, in which the conductors from which the cars receive their current are located. At the junction of the main track with the side track is arranged a switch-tongue $d$, pivoted at $d'$ in a widened part $n$ of the track. In the conduit C and below the junction of the slots of the main and side tracks is placed a ugide-piece $e$, which directs the contact-shoe and supporting-plate of the cars along the side-track conductor when it is desired to switch the car onto the side track. This switch-tongue $d$ and guide-piece $e$ are connected by suitable mechanism, which hitherto it was usual to move by a hand-lever, which required the employment of a switchman. The guide-piece $e$ is attached to the upper part of a pivoted upright $f$, movable in sockets $f'\,f^2$ of the conduit structure, to the lower end of which is attached a plate or bar $g$. A second upright $h$, movable in sockets $h'\,h^2$ of the conduit structure, is arranged in the casing D, and to the lower end of the same is fastened a plate or bar $i$, which is connected by a bar $j$ with the bar $g$. To the upper end of the upright $h$ is fastened a plate or bar $k$, which is connected with an armature-lever $l$ by a connecting-bar $m$. The connecting-bar $m$ is provided with a pin $p$, that passes upwardly through a slot $o$ in the widened part $n$ of the track engaging with the pivoted switch-tongue $d$. The electromagnet E is of suitable size and strength and actuates when current is passed through the same the fulcrumed armature-lever $l$. The lever $l$ is connected with a stationary point, preferably the track $a$, by a strong helical spring S, the purpose of which is to set the switch-operating mechanism in its normal position after the current has ceased to energize the electromagnet. At one side of or above the conductor $r$ of the main track, extending from a certain distance at one side of the junction of the main and side tracks to a certain distance at the other side of the main and side tracks, is arranged in the conduit an auxiliary conductor $t$, which is connected at a point $t^{10}$ with one of the tracks, which serve as the return-circuit. This auxiliary conductor extends about thirty yards either way of the junction of the main and side tracks and with it are connected in series the coils of the electromagnet E. The car is supplied with an auxiliary contact-shoe $t'$, which when the car arrives at the end $t^2$ of the auxiliary conductor $t$ closes the switch-actuating circuit, and so energizes the coils of the magnet. This circuit is provided with a switch $v$, which is arranged on the platforms of the car within convenient reach of the motorman and which in order to close the switch-actuating circuit must first be closed. The motor of the car is supplied from the main conductor $r$ by the contact-shoe $r'$, the return-circuit passing through the tracks in the usual manner. One terminal of the auxiliary circuit, which consists of the switch $v$, the auxiliary contact-shoe $t'$, the auxiliary conductor $t$, and the electromagnet E, is connected with one terminal of the motor M, as shown in Figs. 1, 2, and 5, while the other is connected with one of the tracks.

The operation of my improved device is as follows: When the car which is provided with the motor contact-shoe $r'$ and the auxiliary contact-shoe $t'$ arrives at the position shown in Fig. 1, the motorman closes the switch $v$. During this time the auxiliary contact-shoe $t'$ comes in contact with the auxiliary conductor $t$, whereby the auxiliary circuit is closed and the electromagnet E energized, the switch mechanism actuated, and thereby the switch-tongue $d$ and guide-piece $e$ set in position, so that when the car reaches the same it is caused to be switched over onto the side track. The switch-tongue $d$ and guide-piece $e$ remain in this position until the car has passed the end $t^4$ of the auxiliary conductor, whereupon the auxiliary circuit is interrupted, the attractive force of the magnet E also interrupted, whereupon the spring S moves the switch-tongue $d$ and guide-piece $e$ back to their normal position. When it is desired that the car should not be switched over onto the side line, the switch $v$ will not be closed, and hence the auxiliary contact-shoe $t'$ will move along the auxiliary conductor $t$ without actuating the electromagnet E and the switch-operating mechanism. Hence when the auxiliary circuit is not closed the switch-operating parts remain in their normal position, and the car will continue along the main track.

By my improved switch for railways the setting of the switch-tongue is accomplished by the motorman, so that the employment of a special switchman is dispensed with, as the switch-tongue and guide-piece are readily actuated from the car by the auxiliary circuit, so that the car can pass from the main track onto the side track or remain on the main track, as desired.

Having thus described my invention, I claim as new and desire to secure by Letters Patent—

1. A railway-switch for underground electric traction systems, comprising a switch-tongue at the junction of a main and side track, an underground pivoted guide-piece at the junction of the main and side conduits, an auxiliary conductor in the conduit connected with a source of electric power, and means adapted to contact with the auxiliary conductor for actuating said pivoted switch-tongue and guide-piece, substantially as set forth.

2. In a railway-switch, the combination, with the main and side tracks provided with conduits having underground conductors, of a pivoted switch-tongue at the junction of the main and side tracks, a pivoted guide-piece in the conduit below the junction of the slots of the main and side conduits, means connecting said switch-tongue and guide-piece, electrically-operated means for actuating said connecting means, an auxiliary conductor extending from the main conduit into the side conduit and connected with a source of electric power, and means for actuating said electrically-operated means when contacting with the auxiliary conductor, substantially as set forth.

3. In a railway-switch, the combination, with the main and side tracks provided with conduits having underground conductors, of a pivoted switch-tongue at the junction of the main and side tracks, a pivoted guide-piece in the conduit below the junction of the slots of the main and side conduits, a cross-bar connecting said switch-tongue and guide-piece, an electromagnet, an armature for the same connected with the cross-bar, a spring for returning the armature into normal position, a switch, an auxiliary conductor extending from the main conduit into the side conduit at a certain distance at either side of the switch-tongue and connected with the electromagnet, switch and a source of electric power, and means contacting with the auxiliary conductor for energizing the electromagnet and actuating the switch-tongue and guide-piece, substantially as set forth.

In testimony that I claim the foregoing as my invention I have signed my name in presence of two subscribing witnesses.

JOHANN GEORG WENIGER.

Witnesses:
   PAUL GOEPEL,
   C. P. GOEPEL.